United States Patent [19]
Imoto et al.

[11] Patent Number: 5,570,448
[45] Date of Patent: Oct. 29, 1996

[54] RARE EARTH ELEMENT-DOPED MULTIPLE-CORE OPTICAL FIBER, METHOD FOR FABRICATING THE SAME, AND OPTICAL AMPLIFIER USING THE SAME

[75] Inventors: Katsuyuki Imoto, Saitama-ken; Kazuo Koya, Gunma-ken, both of Japan

[73] Assignees: Hitachi Cable, Ltd.; Shin-Etsu Chemical Co., Ltd., both of Tokyo, Japan

[21] Appl. No.: 476,445

[22] Filed: Jun. 7, 1995

[30] Foreign Application Priority Data

Jul. 27, 1994 [JP] Japan ................................ 6-175366

[51] Int. Cl.⁶ .................................................. G02B 6/02
[52] U.S. Cl. ........................ 385/126; 385/123; 385/124; 385/141
[58] Field of Search .................................. 385/126, 125, 385/123, 124, 141–145

[56] References Cited

U.S. PATENT DOCUMENTS 5,351,335  9/1994  Ohishi et al. ............................ 385/142
5,412,672  5/1995  Ainslie et al. ...................... 385/142 X

FOREIGN PATENT DOCUMENTS

5-299733  11/1993  Japan .
5-345632  12/1993  Japan .
6-37385   2/1994   Japan .

*Primary Examiner*—Rodney B. Bovernick
*Assistant Examiner*—Phan T. H. Palmer
*Attorney, Agent, or Firm*—Helfgott & Karas, P.C.

[57]  ABSTRACT

At least three elementary optical fibers are covered with a jacket layer. Each of the elementary optical fibers has a core of a first refractive index doped with at least one rare earth element and Al, and a cladding layer of a second refractive index lower than the first refractive index for covering the core. A value of $(1+2t/Dw)$ is ranged to be 1.1 to 2.5, where t is a thickness of the cladding layer, and Dw is an outer diameter of the core, and a doping amount of Al is at least 1 weight %. The at least three elementary optical fibers are inserted into a jacket tube, and the elementary optical fibers and the jacket tube are heated to be welded at contact surfaces thereof by vacuum-drawing air from interstices of the elementary optical fibers and the jacket tube. Thus, a preform is obtained, and the preform is heated to be drawn. Consequently, a rare earth element-doped multiple-core optical fiber is fabricated. The rare earth element-doped multiple-core optical fiber is used to amplify a signal light to be propagated therethrough by receiving an excitation light.

16 Claims, 10 Drawing Sheets

RARE EARTH ELEMENT-DOPED MULTIPLE-CORE OPTICAL FIBER, METHOD FOR FABRICATING THE SAME, AND OPTICAL AMPLIFIER USING THE SAME

FIELD OF THE INVENTION

The invention relates to a multiple-core optical fiber having high gain and wide wavelength band characteristics, and more particularly to, an optical fiber having multiple-cores doped with a rare earth element and aluminum, a method for fabricating the same, and an optical amplifier using the same.

BACKGROUND OF THE INVENTION

These days, optical amplifiers using rare earth element-doped optical fibers have been researched and developed in the fields of optical communication, optical signal processing, optical measurement, and so on. The rare earth element-doped optical fiber comprises a core having a refractive index higher than that of a cladding layer, and containing a doped rare earth element such as Er, Nd, Pr, etc., and the optical amplifier using the optical fiber comprises a light source for emitting an excitation light which is absorbed in the optical fiber inherently to the doped rare earth element to amplify a signal light transmitted through the optical fiber. Among optical amplifiers using several rare earth elements, an optical amplifier doped with Er has been remarkably enhanced in performance to provide a gain of more than 40 dB.

Conventional rare earth element-doped multiple-core optical fibers have been proposed firstly in the world by the inventors, and power amplifiers using the optical fibers have been proposed to provide high gains as shown in the Japanese Patent Kokai Nos. 5-299733 and 6-37385. In accordance with the use of such high gain-optical fiber amplifiers, signal lights of more than ten channels which are wavelength-multiplexed have been studied to be transmitted via optical fiber transmission lines. In such optical fiber transmission lines, the high gain optical amplifiers are required to have wide wavelength band characteristics in which signal lights having wavelengths ranging in a wide band are uniformly amplified.

In order to realize such wide band optical fiber amplifiers, several proposals have been studied as explained below.

The first proposal is that the wide wavelength characteristics are mainly enhanced, while the increase of gains is sacrificed, because a wavelength band is narrowered, when the maximum gain is obtained. In this proposal, the gain is suppressed by lowering the level of an excitation light, while the level of a signal light is not lowered, but is maintained to be an ordinary value, so that an optical fiber amplifier having the wide wavelength characteristics is obtained.

The second proposal is that a high concentration, for instance, up to 3% of aluminum is doped into a core of an optical fiber to provide the wide wavelength band.

The third proposal is that a length of an optical fiber is designed to be sufficiently shorter than, for instance, one half of an optimum length for an optical fiber amplifier, so that the wide wavelength characteristics are obtained, while the gain is slightly sacrificed.

The fourth proposal is that optical fiber amplifiers are connected in series, and variable attenuators are inserted into each two adjacent optical fiber amplifiers, so that the gain is suppressed to provide the wide wavelength band characteristics.

The fifth proposal is that optical fiber amplifiers are connected in series, and waveguide type March-Zender optical filters are inserted into each two adjacent optical fiber amplifiers, so that gains are equalized at a predetermined wavelength band to provide the wide wavelength characteristics.

The sixth proposal is that powers of signal lights to be wavelength-multiplexed are controlled at each wavelength at a light source. Thus, the uniformity of the gains and band characteristics is obtained.

In the above described proposals, however, there are disadvantages as explained below.

In the first proposal, an optical fiber amplifier is only used under a situation where powers of a signal light and an excitation light are limited.

In the second proposal, the maximum concentration of aluminum is 3% in a core of an optical fiber amplifier due to the restriction in a fabrication process thereof. As a result, a gain is approximately 26 dB, and a wavelength band is approximately 25 nm at a gain of 3 dB. This is not sufficient for the practical use of optical fiber amplifiers.

In the third proposal, a high gain and wide wavelength band characteristics are not obtained simultaneously, because an optical fiber is short.

In the fourth and fifth proposals, the efficiency becomes low, because gains are largely suppressed.

In the sixth proposal, a driving circuit in the light source becomes complicated, and the powers must be controlled at each wavelength dependently on each optical fiber amplifier.

As discussed above, the wide wavelength charcteistics are not consistent with the gains in the conventional optical fiber amplifiers having single cores doped with a rare earth element.

SUMMARY OF THE INVENTION

Accordingly, it is an object of the invention to provide a rare earth element-doped multiple-core optical fiber, a method for fabricating the same, and an optical amplifier using the same, in which high gain and wide wavelength band charecteristies are simultaneously obtained.

It is a further object of the invention to provide a rare earth element-doped multiple-core optical fiber, a method for fabricating the same, and an optical amplifier using the same, by which long distance communication and multiple-channel wavelength multiplexed transmission are realized.

It is a still further object of the invention to provide a rare earth element-doped multiple-core optical fiber, a method for fabricating the same, and an optical amplifier using the same, by which optical communication, signal processing, and measurement systems are structured economically.

It is a still yet further object of the invention to provide a rare earth element-doped multiple-core optical fiber having the minimum noise index and providing high quality information transmission, a method for fabricating the same, and an optical amplifier using the same.

It is an additional object of the invention to provide a rare earth element-doped multiple-core optical fiber having improved structural parameters, a method for fabricating the same, and an optical amplifier using the same.

According to the first aspect of the invention, a rare earth element-doped multiple-core optical fiber, comprises:

at least three elementary optical fibers each comprising a core of a refractive index nw having an outer diameter of Dw, and a cladding layer of a refractive index nc(nw>nc) having a thickness of t for covering the core; and a jacket layer of a refractive index nj (nw>nj) for covering the at least three elementary optical fibers;

wherein the core is doped with at least one rare earth element and Al of a least 1 weight %; and a value of (1+2t/Dw) defined by the outer diamer of Dw and the thickness of t is ranged to be 1.1 to 2.5.

According to the second aspect of the invention, a method for fabricating a rare earth element-doped multiple-core optical fiber, comprises the steps of:

providing at least three elementary optical fibers each comprising a core of a refractive index nw having an outer diameter of Dw, and a cladding layer of a refractive index nc (nw>nc) having a thickness of t for covering the core, the core being doped with at least one rare earth element and Al of at least 1 weight %, and a value of (1+2t/Dw) defined by the outer diameter of Dw and the thickness of t being ranged to be 1.1 to 2.5;

placing the at least three elementary optical fibers in a jacket tube;

providing a composite member by collapsing interstices among the at least three elementary optical fibers and the jacket tube to be welded at contact surfaces thereof at a predetermined heating temperature; and heating and drawing the composite member at a predetermined temperature.

According to the third aspect of the invention, an optical amplifier using a rare earth element-doped multiple-core optical fiber, comprises:

a rare earth element-doped multiple-core optical fiber of a predetermined length, the rare earth element-doped multiple-core optical fiber comprising at least three elementary optical fibers each comprising a core of a refractive index nw having an outer diameter of Dw, and a cladding layer of a refractive index nc(nw>nc) having a thickness of t for covering the core, and a jacket layer of a refractive index nj (nw>nj) for covering the at least three elementary optical fibers, the core being doped with at least one rare earth element and Al of at least 1 weight %, and a value of (1+2t/Dw) defined by the outer diameter of Dw and the thickness of t being ranged to 1.1 to 2.5;

means for input of a signal light to an input end of the rare earth element-doped multiple-core optical fiber;

means for propagating an excitation light through the rare earth element-doped multiple-core optical fiber to amplify the signal light therein; and means for output of the signal light thus amplified from an output end of the rare earth element-doped multiple-core optical fiber.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
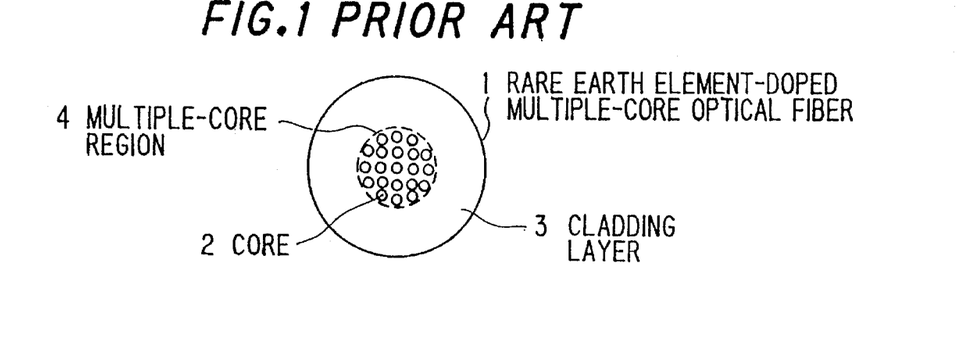
FIG. 1 is a cross-sectional view showing a rare earth element doped multiple-core optical fiber which is formerly proposed by the inventors.

Before describing a rare earth element-doped multiple-core optical fiber in the preferred embodiment according to the invention, the aforementioned rare earth element-doped multiple-core optical fiber proposed by the inventors and described in the Japanese Patent Kokai Nos. 5-299733 and 6-37385 will be explained in FIG. 1.

The inventor's proposed rare earth element-doped multiple-core optical fiber 1 comprises a multiple-core region 4 composed of a plurality of rare earth element-doped cores 2, and a cladding layer 3, wherein a refractive index of the rare earth element-doped cores 2 is higher than that of the cladding layer 3.

In this rare earth element-doped multiple-core optical fiber, a gain and wide wavelength band characteristics are not consistent with each other as described before.

Figure 2:
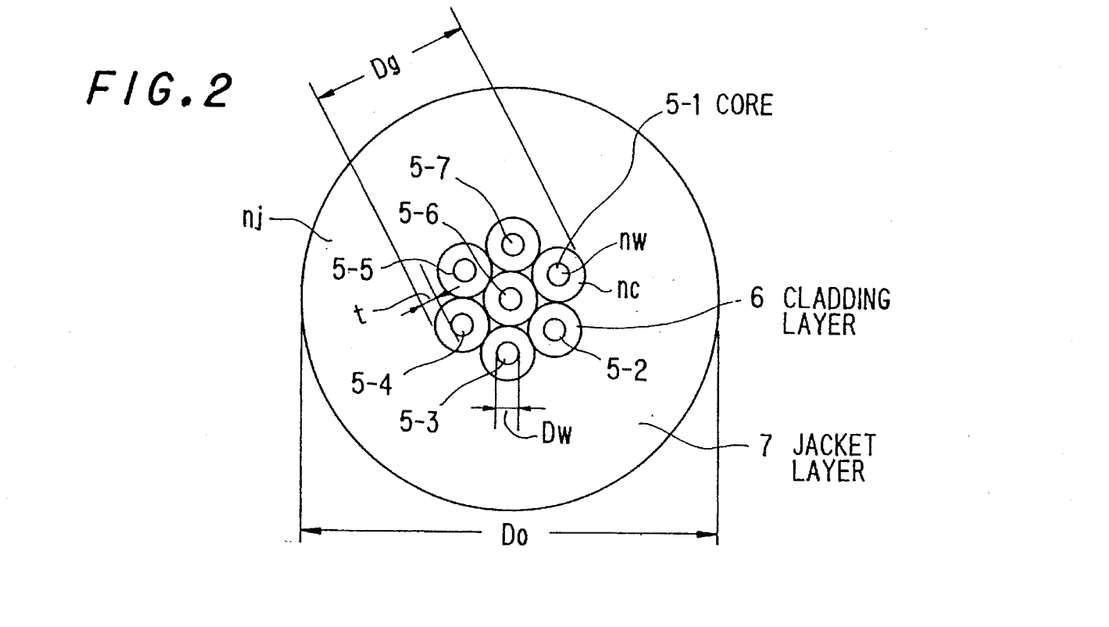
FIG. 2 is a cross-sectional view showing an ideal structure of a rare earth element-doped multiple-core optical fiber provided in the invention.

Next, a rare earth element-doped multiple-core optical fiber in a first preferred embodiment according to the invention will be explained in FIG. 2.

The optical fiber comprises a plurality of cores 5-1, 5-2, - - - 5-7 each composed of $SiO_2$ doped with $GeO_2$, $Al_2O_3$ and Er ions and covered with a cladding layer 6, and a jacket layer 7 for covering the cladding layer-covered cores 5-1, 5-2, - - - 5-7.

In this optical fiber, an outer diameter $D_0$ of the jacket layer 7 is 125 μm, an outer diameter Dg of the cladding layer-covered cores 5-1, 5-2, - - - 5-7 which are of a multiple-core is 4.4 μm to provide a ratio $D_0/Dg$ of 28.4 ($D_0/Dg$=28.4), an outer diameter Dw of each core 5-1, 5-2, - - - 5-7 is 1.23 μm to provide a value (1+2t/Dw) of 1.2 [(1+2t/Dw)=1.2], where t is a thickness of the cladding layer 6, a refractive index nw of the cores 5-1, 5-2, - - - 5-7 is 1.48, that of the cladding layers 6 and the jacket 7 layer is 1.458. The specific refraction index differences Δn1 and Δn2 are therefore 1.487, where Δn1=((nw−nc)/nw)×100% and Δn2=((nw−nj)/nw)×100%. Δn1 represents the difference between the core and the cladding layer and Δn2 represents the difference between the core and the jacket layer.

In fabrication, elementary optical fibers each comprising the core 5-1, 5-2, - - - or 5-7 and the cladding layer 6 are inserted into a quartz glass tube to be drawn under vacuum state therein at a predetermined temperature, and outer surfaces of the cladding layers 6, and the outer surfaces thereof and an inner layer of the quartz glass tube are thermally adhered to each other, so that a rare earth element-doped multiple-core optical fiber having an outer diameter $D_0$ of 125 μm is fabricatied. The cross-sectional configuration of the rare earth element-doped multiple-core optical fiber is shown in FIG. 3, although an ideal configuration is shown in FIG. 2.

Figure 3:
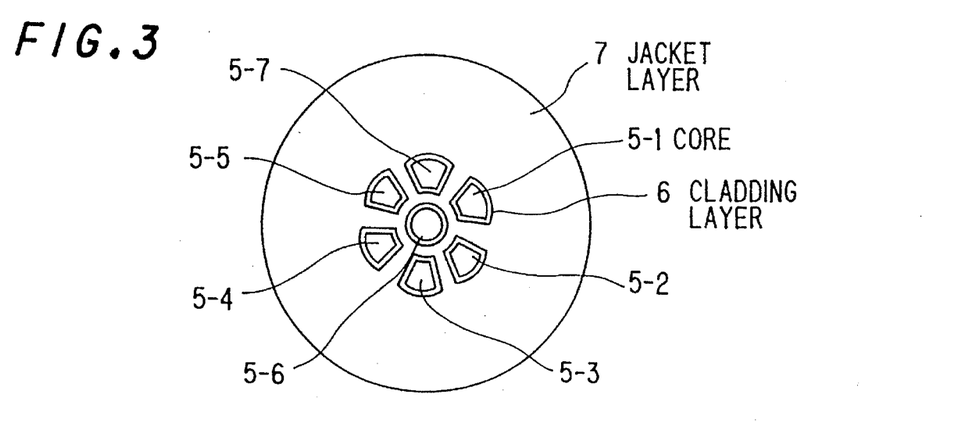
FIG. 3 is a cross-sectional view showing a practical structure of a rare earth element-doped multiple-core optical fiber provided in the invention.

In the rare earth element-doped multiple-core optical fiber as shown in FIG. 3, a length thereof providing the maximum gain is approximately 72 m, when a signal light having a wavelength of 1.55 μm and an excitation light having a wavelength of 1.48 μm are used. In more specifically, the gain is approximately 25 dB and a noise index is 5 dB, when a power of the signal light is 27 dBm, and that of the excitation light is 40 mW.

Figure 4:
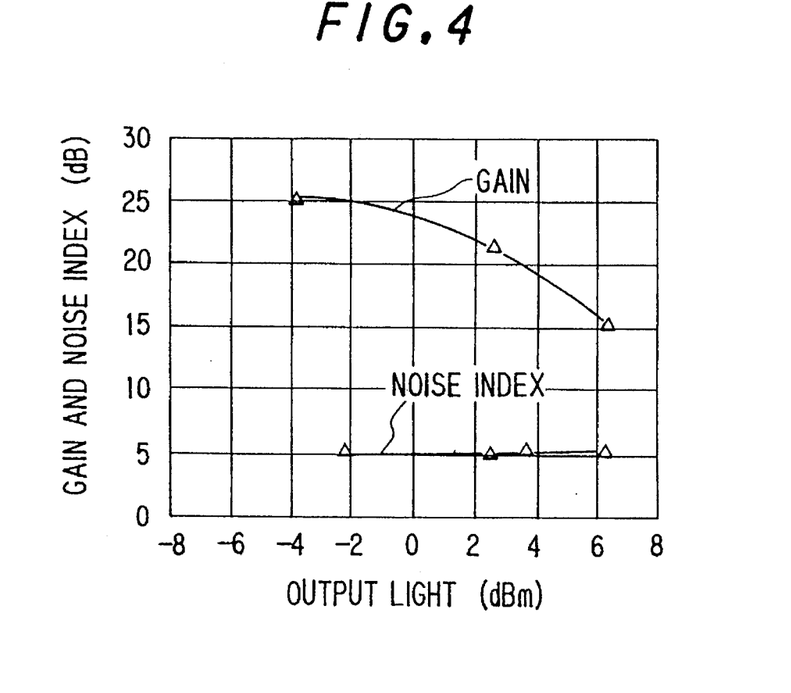
FIG. 4 is a graph showing a gain and a noise index relative to an output light for a rare earth element-doped multiple-core optical fiber provided in the invention.
Figure 5:
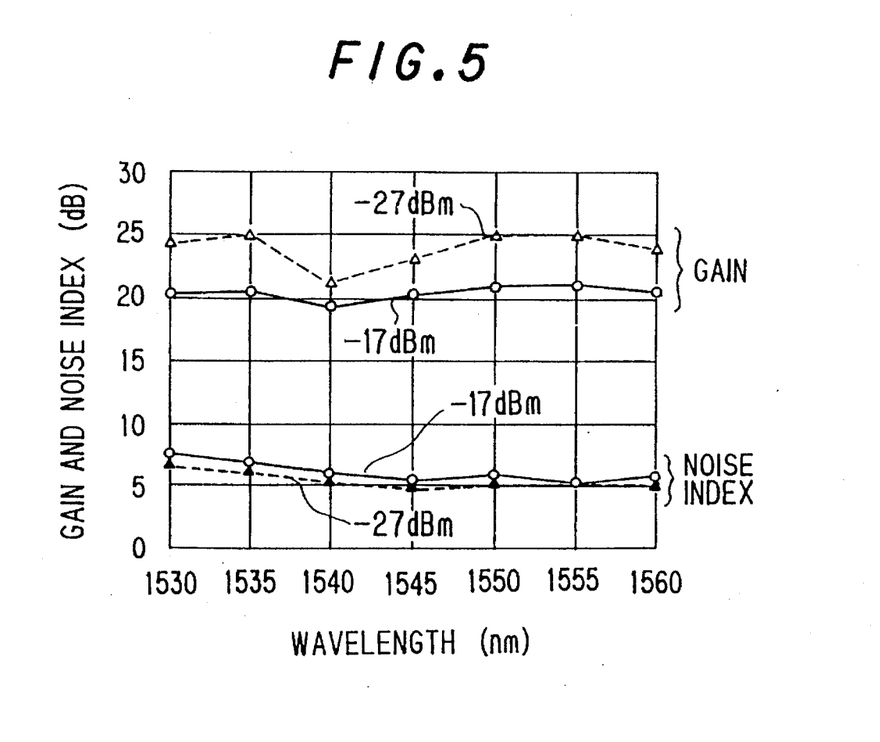
FIG. 5 is a graph showing a gain and a noise index relative to a wavelength for a rare earth element-doped multiple-core optical fiber provided in the invention.

In the rare earth element-doped multiple-core optical fiber in the first preferred embodiment, a gain and a noise index are obtained relative to a power of an output signal light amplified therein as shown in FIG. 4. Further, a gain and a noise index are obtained relative to a wavelength of a signal light as shown in FIG. 5. As clearly shown therein, a gain fluctuation is suppressed to be less than 3 dB at a wavelength band of 530 nm to 1560 nm, when a power of the output signal light is −27 dBm, and to be less than 1 dB at the same wavelength band, when the power of the output signal light is −17 dBm. On the other hand, a noise index is not changed significantly at this wavelength band.

A rare earth element-doped multiple-core optical fiber in a second preferred embodiment according to the invention will be explained in FIG. 2.

In the second preferred embodiment, an outer diameter Dg of the multiple-core is 6.5 μm, and an outer diameter Dw of each core 5-1, 5-2, - - - 5-7 is 1.81 μm, while the other structural paremeters remain unchanged from those used in the first preferred embodiment. Thus, "$D_0/Dg$" is calculated to be approximately 19.2, and "1+2t/Dw" is calculated to be approximately 1.36.

The rare earth element-doped multiple-core optical fiber is supplied with a signal light having a wavelength of 1.55 μm and an excitation light having a wavelength of 1.48 μm, wherein a gain is maximum, when a length thereof is 25 m. The gain is obtained to be approximately 32 dB which is higher than that in the first preferred embodiment, when a power of the signal light is −27 dBm, and a power of the excitation light is 40 mW. This is because "1+2t/Dw" is increased from 1.20 to 1.36 as compared to that in the first preferred embodiment.

Figure 6:
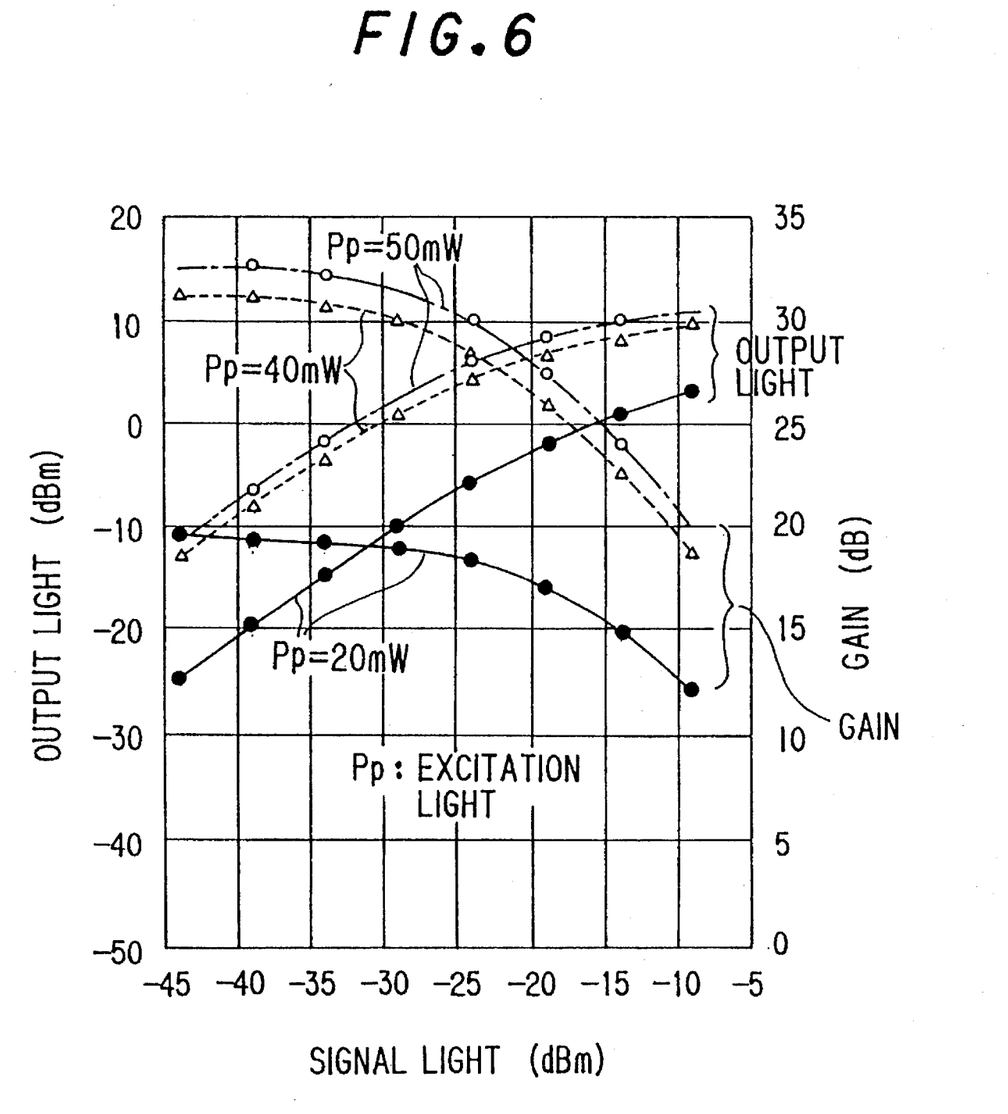
FIG. 6 is a graph showing an output light relative to an input signal light for a rare earth element-doped multiple-core optical fiber provided in the invention.

FIG. 6 shows an output signal light obtained by amplifying an input signal light and a gain relative to the input signal light in the rare earth element-doped multiple-core optical fiber in the second preferred embodiment which is used for an optical amplifier.

A rare earth element-doped multiple-core optical fiber in a third preferred embodiment according to the invention will be explained in FIG. 2.

In the third preferred embodiment, an outer diameter Dg of the multiple-core is 9.72 μm, and an outer diameter Dw of each core 5-1, 5-2, - - - 5-7 is 1.95 μm, while the other structural parameters remain unchanged from those used in the first preferred embodiment. Thus, "$D_0/Dg$" is calculated to be approximately 12.9, and "1+2t/Dw" is calculated to be approximately 2.29.

The rare earth element-doped multiple-core optical fiber is supplied with an excitation light having a wavelength of 0.98 μm, wherein a gain is maximum, when a length thereof is 32 m. The gain is obtained to be approximately 37 dB which is higher than that in the first preferred embodiment, when a power of the signal light is −37 dBm, and a power of the excitation light is 120 mw.

Figure 7:
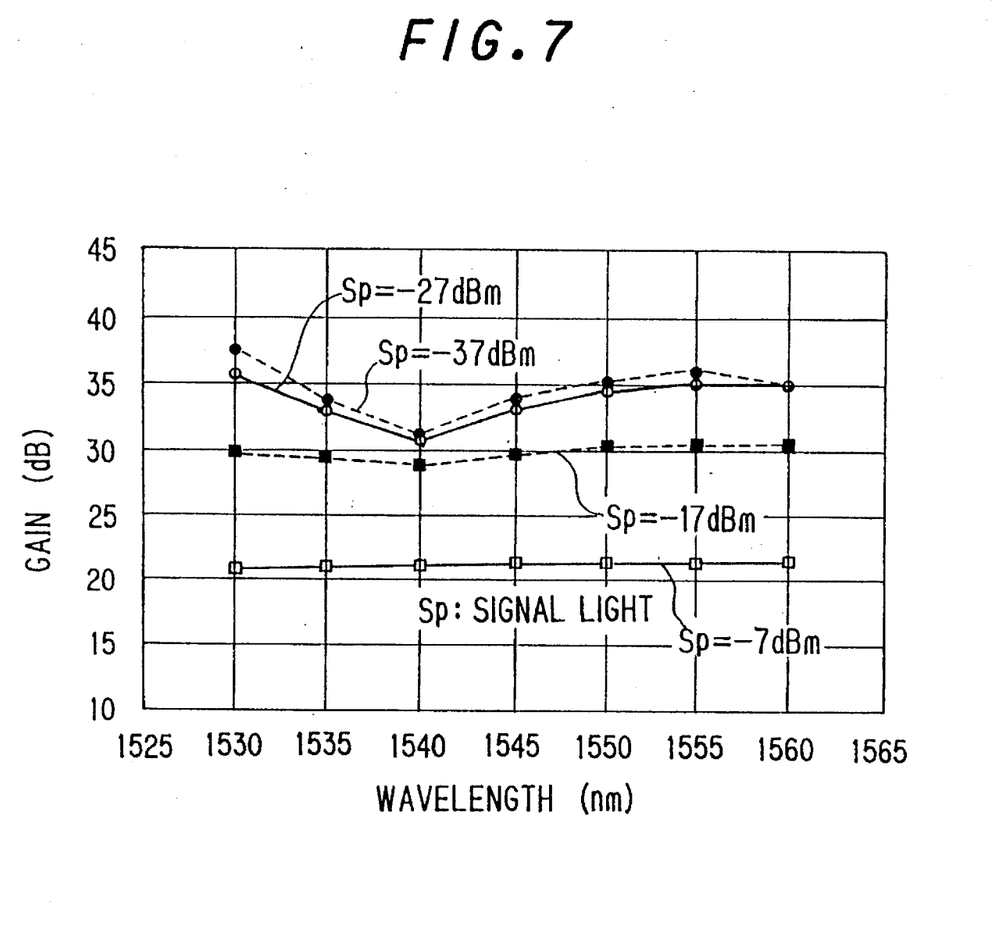
FIG. 7 is a graph showing a gain relative to a wavelength for a rare earth element-doped multiple-core optical fiber provided in the invention.

FIG. 7 shows a high gain and wide wavelength band characteristics obtained in the third preferred embodiment, wherein gains are flat to be approximately 22 dB and 31 dB at wavelengths of 1.53 μm to 1.56 μm, when signal powers are −7 dBm and −17 dBm, and the fluctuation of gains is suppressed to be less than 3 dB at the same wavelength band, when a signal power is −27 dBm.

As described above, a high gain and wide wavelength band characteristics are obtained by making a value "1+2t/Dw" large. This is because of the assumption that a signal light and an excitation light are divided equally to be distributed to a plurality of cores 5-1, 5-2, - - - 5-7. As a result, gains of the divided signal lights in the cores 5-1, 5-2, - - - 5-7 are not high to provide the wide wavelength band characteristics, so that a gain is obtained to be high at an output end of the rare earth element-doped multiple-core optical fiber in accordance with the summation of amplified powers in the cores 5-1, 5-2, - - - 5-7, while the wide wavelength band characteristics are maintained. In principle, a high gain and wide wavelength band characteristics are enhanced, as the number of the cores 5-1, 5-2, - - - 5-7 is increased. Practically, however, intervals of the cores 5-1, 5-2, - - - 5-7 become narrow, as the number thereof is increased. Thus, a multiple-core optical fiber is proximate to a single-core optical fiber. For this reason, it is necessary for the value "1+2t/Dw" to be in a range of 1.1 to 2.2, and "$D_0/Dg$" to be in a range of 12.5 to 30.

A rare earth element-doped multiple-core optical fiber in a fourth preferred embodiment according to the invention will be explained in FIG. 2.

In the fourth preferred embodiment, a doping amount of aluminum in the cores 5-1, 5-2, - - - 5-7 is increased to be 4,000 weight ppm, and that of Er is increased to be 400 weight ppm, while the other structural parameters are the same as those in the second preferred embodiment.

Figure 8:
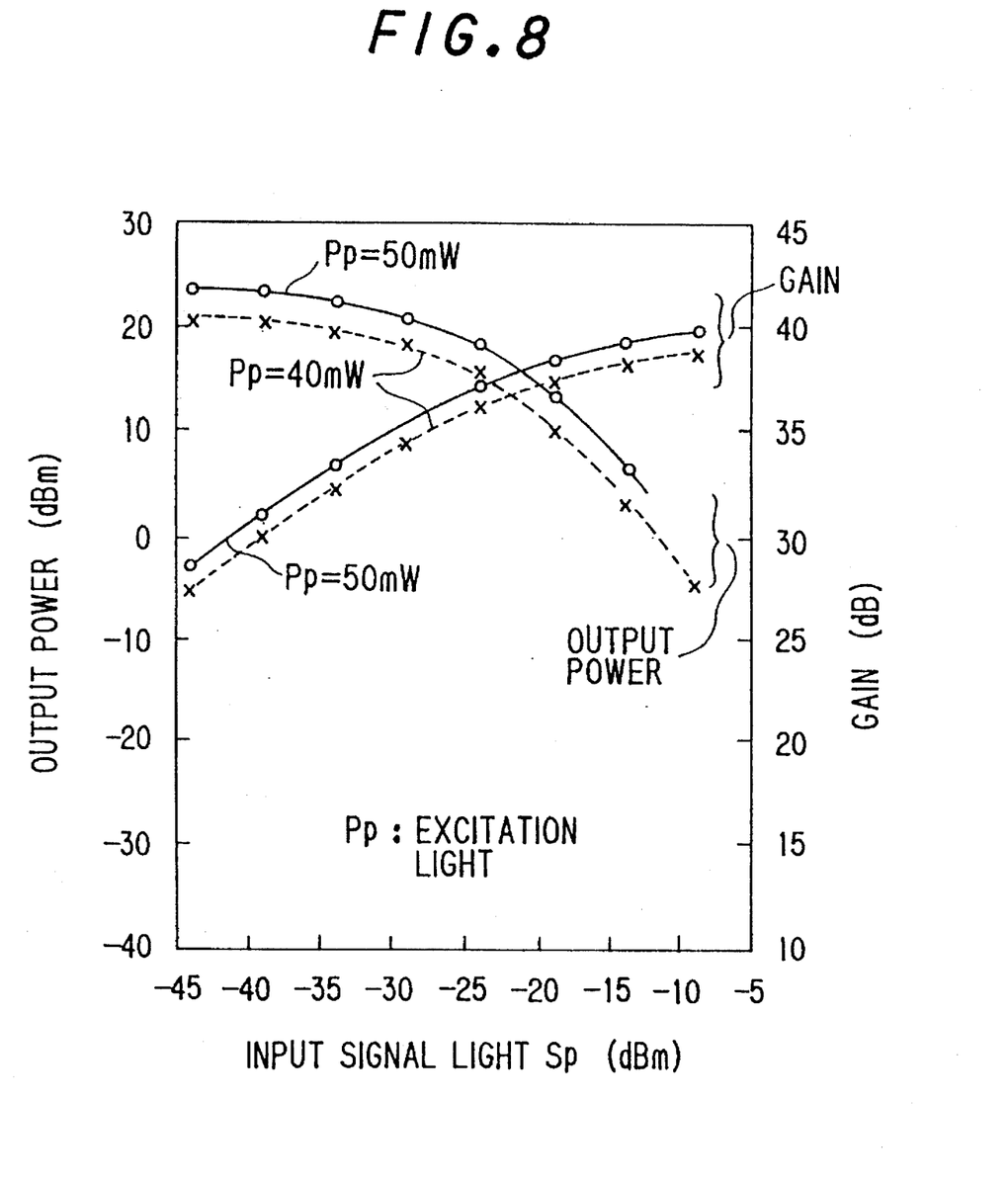
FIG. 8 is a graph showing an output power relative to a signal input for a rare earth element-doped multiple-core optical fiber provided in the invention.

FIG. 8 shows relations between an input signal light and a gain, and the input signal light and an output signal light in the fourth preferred embodiment, wherein excitation lights having powers of 40 mw and 50 mw at a wavelength of 1.48 μm are used, and the maximum gain is 42 dB.

Figure 9:
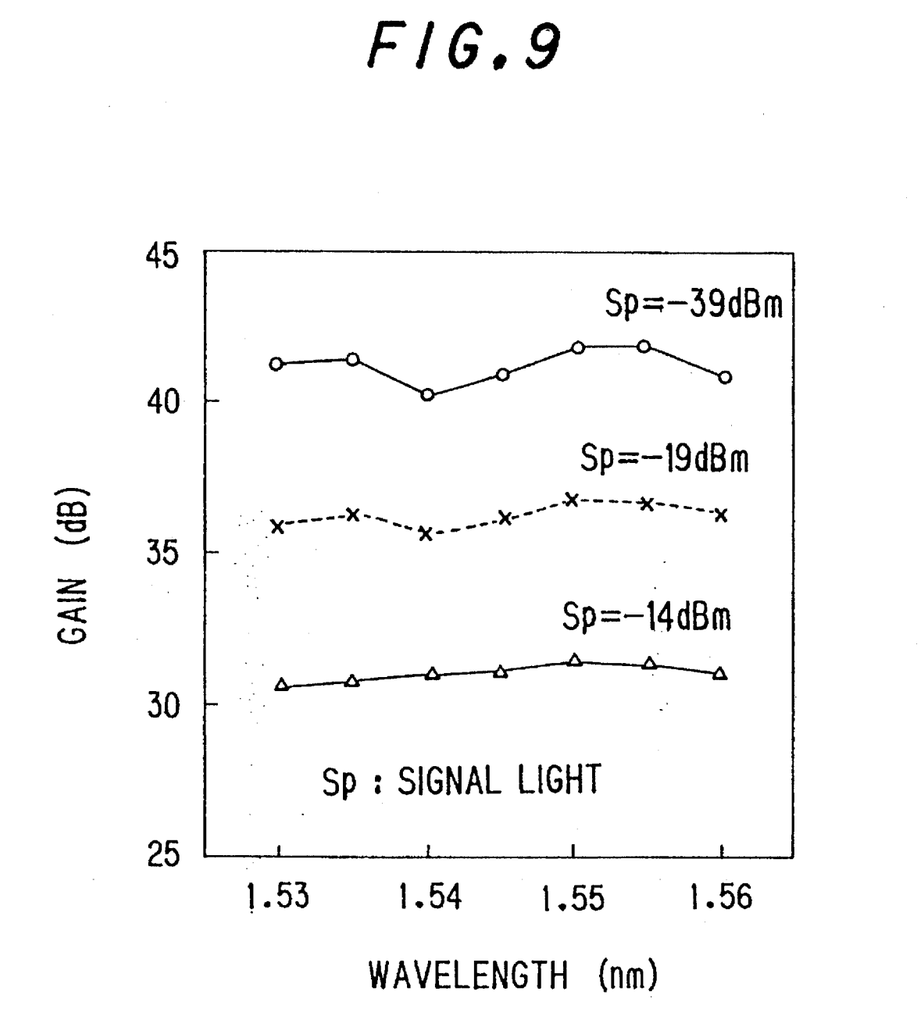
FIG. 9 is a graph showing a gain relative to a wavelength for a rare earth element-doped multiple-core optical fiber provided in the invention.

FIG. 9 shows a gain relative to a wavelength of an input signal light in the fourth preferred embodiment, wherein wide wavelength band characteristics of 30 nm are obtained with the maximum gain of 42 dB and a gain-fluctuation of 3 dB, and gain-fluctuations are suppressed to be less than ±0.6 dB at a wavelength band of 1.53 μm to 1.56 μm for gains of 31 dB and 36 dB. In accordance with the results shown therein, it is predicted that the more a doping amount of aluminum into the cores 5-1, 5-2, - - - 5-7 is increased, the flatter a gain-wavelength band curve becomes, and a higher gain is realized by increasing a doping amount of Er. In a specific modification to provide a high gain, Yb which is a rare earth element is doped into the cores 5-1, 5-2, - - - 5-7 together with Er, and an excitation light having a wavelength of 1.053 μm is used.

Other than Er, Pr is used to amplify a signal light having a wavelength band of 1.3 μm, and Nd is for a signal light having a wavelength band of 1.3 μm or 1.06 μm.

A rare earth element-doped multiple-core optical fiber in a fifth preferred embodiment according to the invention will be explained in FIG. 2.

In the fifth preferred embodiment, a refractive index nw of the cores 5-1, 5-2, - - - 5-7 is 1.479, and specific refractive index differences $\Delta n1$ and $\Delta n2$ are 1.42%, while the other structural parameters are the same as those in the second preferred embodiment. As a result, a gain is slightly lowered as compared to that in the second preferred embodiment by 0.4 dB.

On the other hand, a modification is made such that a refractive index of the cores 5-1, 5-2, - - - 5-7 is 1.485, and specific refractive index differences $\Delta n1$ and $\Delta n2$ are 1.8%, while the other structural parameters are the same as those in the second preferred embodiment. As a result, a gain is increased by approximately 1.5 dB.

In the first to fifth preferred embodiments, the number of the cores 5-1, 5-2, - - - 5-7 may be at least three. Practically, however, it is preferable to be 7, 10, 14, and 19.

Next, an optical amplifier using one of the aforementioned rare earth element-doped multiple-core optical fibers will be explained.

Figure 10:
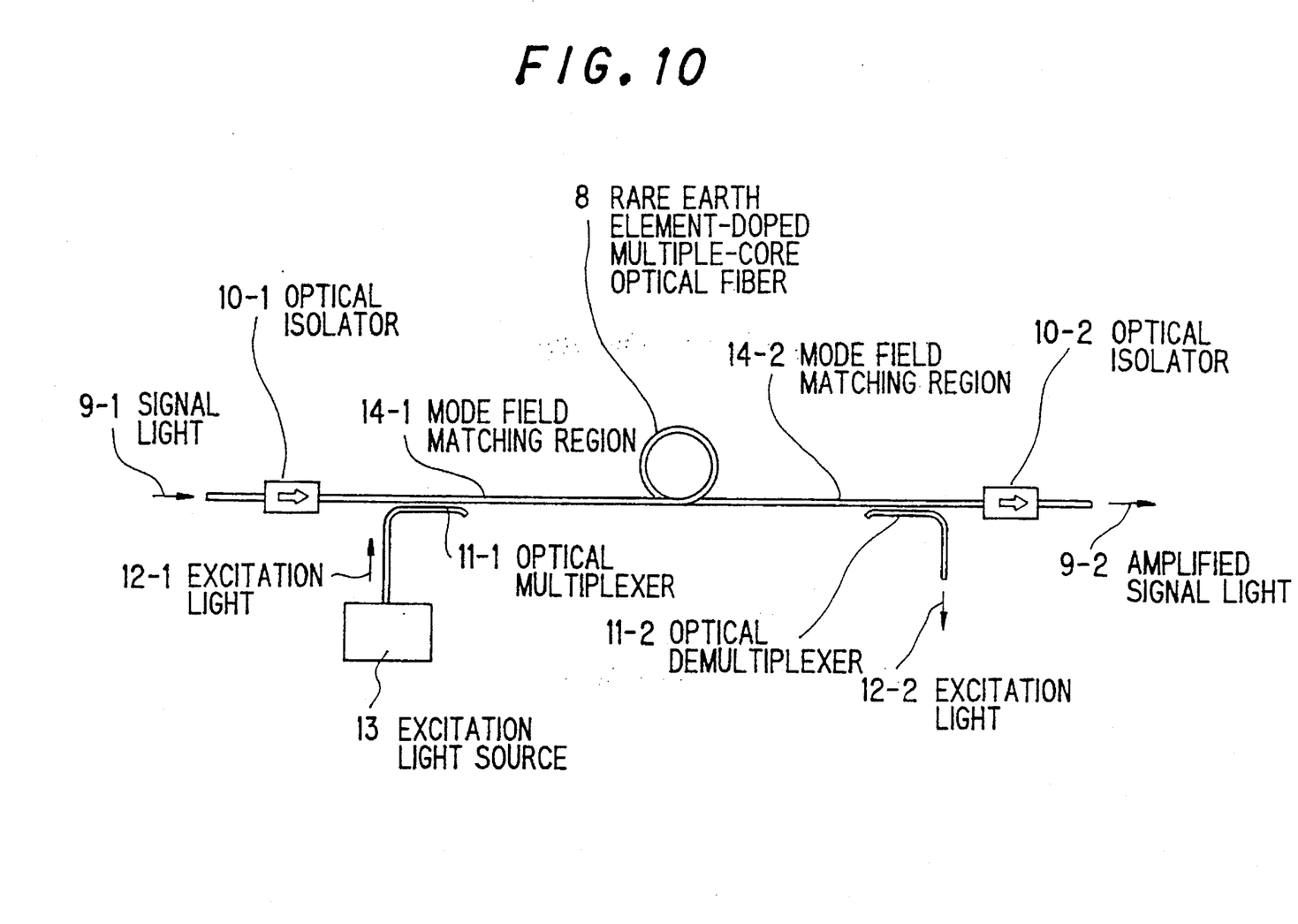
FIG. 10 is an optical amplifier in a first preferred embodiment according to the invention.

FIG. 10 shows an optical amplifier in a first preferred embodiment according to the invention which comprises optical isolators 10-1 and 10-2, an optical multiplexer 11-1, a rare earth element-doped multiple core optical fiber 8, an optical demultiplexer 11-2, an optical isolator 10-2, an excitation light source 13, and an optical fiber for providing mode field matching regions 14-1 and 14-2.

In operation of the optical amplifier in the first preferred embodiment, a signal light 9-1 is supplied via the optical isolator 10-1 to the mode field-matching region 14-1, while an excitation light 12-1 is emitted from the excitation light source 13 to be supplied via the optical multiplexer 11-1 to the mode field-matching region 14-1, so that the signal light 9-1 and the excitation light 12-1 are supplied to the rare earth element-doped multiple-core optical fiber 8, in which the signal light 9-1 is amplified by absorbing the excitation light 12-1. An amplified signal light 9-2 is obtained via the mode field-matching field 14-2 from the optical isolator 10-2, while a remaining portion 12-2 of the excitation light 12-1 which has not contributed to the amplification of the signal light 9-1 is removed from the optical demultiplexer 11-2.

In the optical amplifier in the first preferred embodiment, the optical isolators 10-1 and 10-2 suppress the supply of reflection lights of the amplified signal light 9-2 in the opposite propagation direction.

The mode field-matching regions 14-1 and 14-2 suppress the reflection lights to lower losses caused by the reflection lights, wherein the signal lights 9-1 and 9-2 are reflected due to mode mis-matching resulted from the difference of specific refractive index differences, for which specific refractive index differences $\Delta n1$ and $\Delta n2$ of the rare earth element-doped multiple-core optical fiber 8 are in a range of 1 to 3%, while those of optical fibers on the side of the optical multiplexer 11-1 and the optical demultiplexer 11-2 are in a range of approximately 0.3%.

In the optical amplifier in the first preferred embodiment, the excitation light 12-1 is supplied to the front stage of the rare earth element-doped multiple-core optical fiber 8, and Er, or Er and Yb are doped into the cores 5-1, 5-2, - - - 5-7 of the optical fiber 8, when wavelengths of the excitation light 12-1 are 0.9 μm, 1.05 μm and 1.48 μm.

Figure 11:
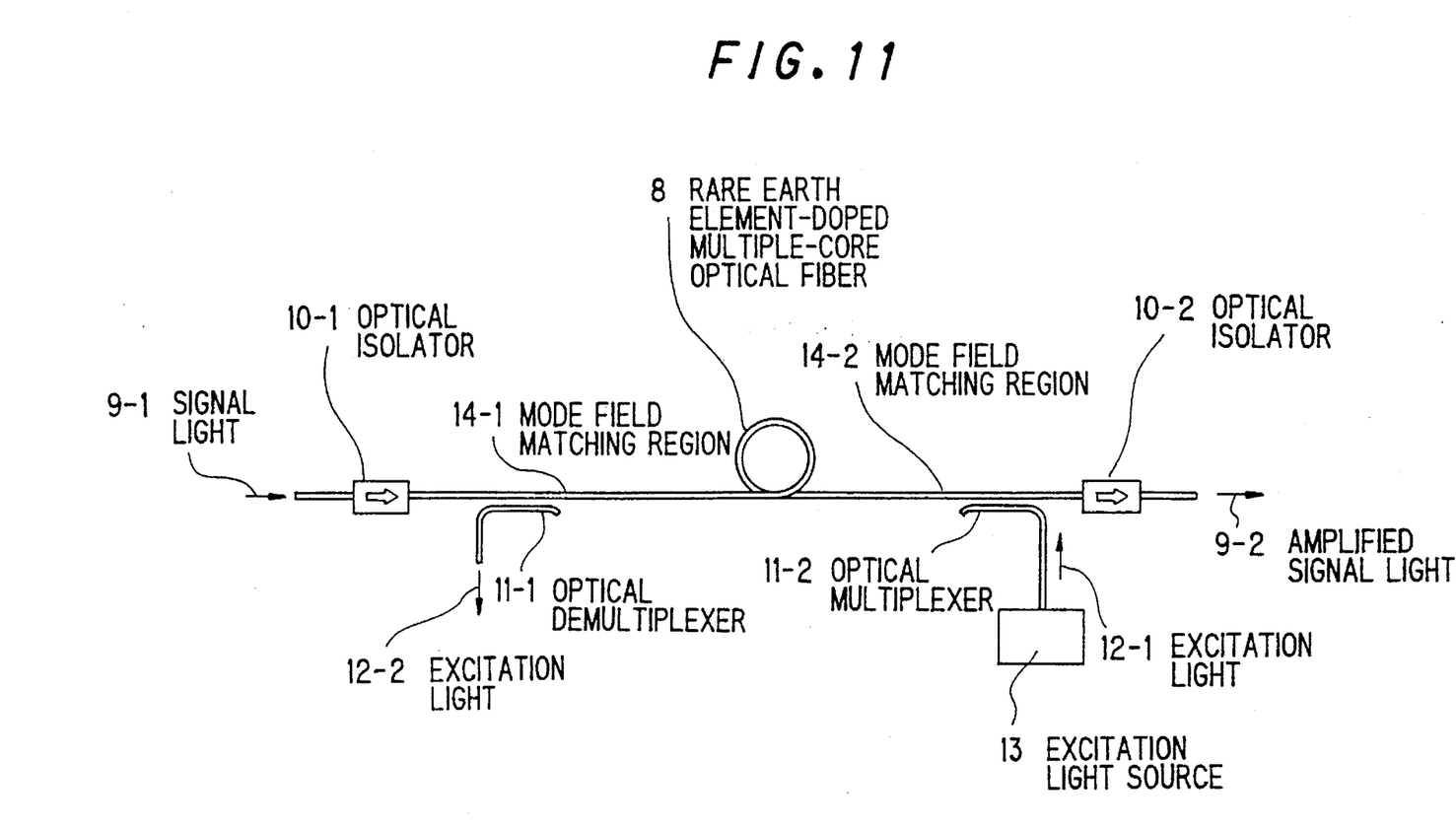
FIG. 11 is an optical amplifier in a second preferred embodiment according to the invention.

FIG. 11 shows an optical amplifier in a second preferred embodiment according to the invention, wherein like parts are indicated by like reference numerals as used in FIG. 10, provided that the excitation light 12-1 is supplied at the rear stage of the rare earth element-doped multiple-core optical fiber 8 thereto by the optical multiplexer 11-2, while the remaining portion 12-2 of the excitation light 12-1 which has not contributed to the amplification of the signal light 9-1 is removed from the optical demultiplexer 11-1.

Figure 12:
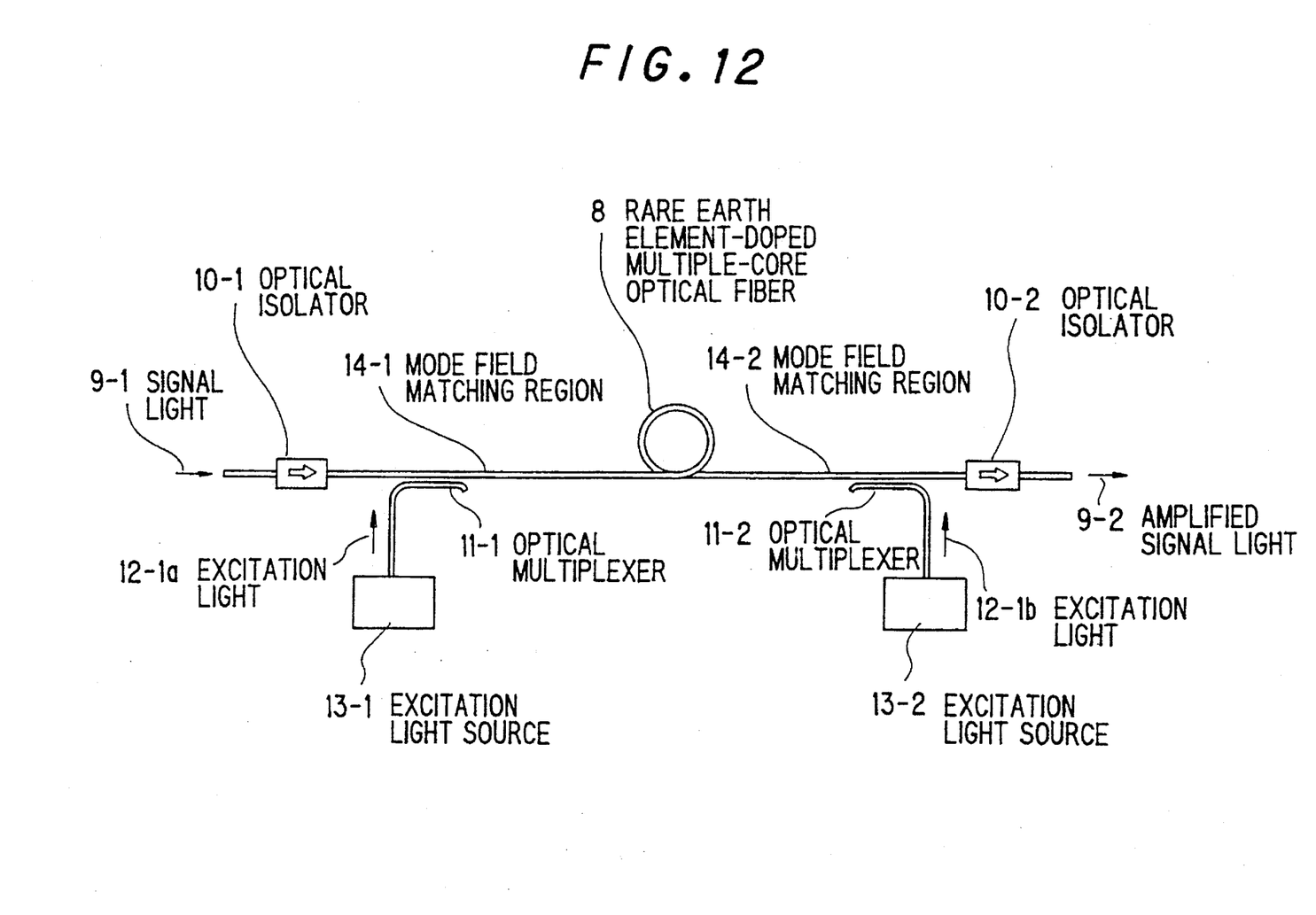
FIG. 12 is an optical amplifier in a third preferred embodiment according to the invention.

FIG. 12 shows an optical amplifier in a third preferred embodiment according to the invention, wherein like parts are indicated by like reference numerals as used in FIGS. 10 and 11, provided that first and second excitation light sources 13-1 and 13-2 are provided to supply excitation lights 12-1a and 12-1b at the front and rear stages of the rare earth element-doped multiple-core optical fiber 8 thereto by the optical multiplexers 11-1 and 11-2.

In the third preferred embodiment, the excitation lights 12-1a and 12-1b may have the same wavelength selected from 0.98 μm, 1.05 μm, and 1.48 μm, or different wavelengths selected therefrom.

Figure 13:
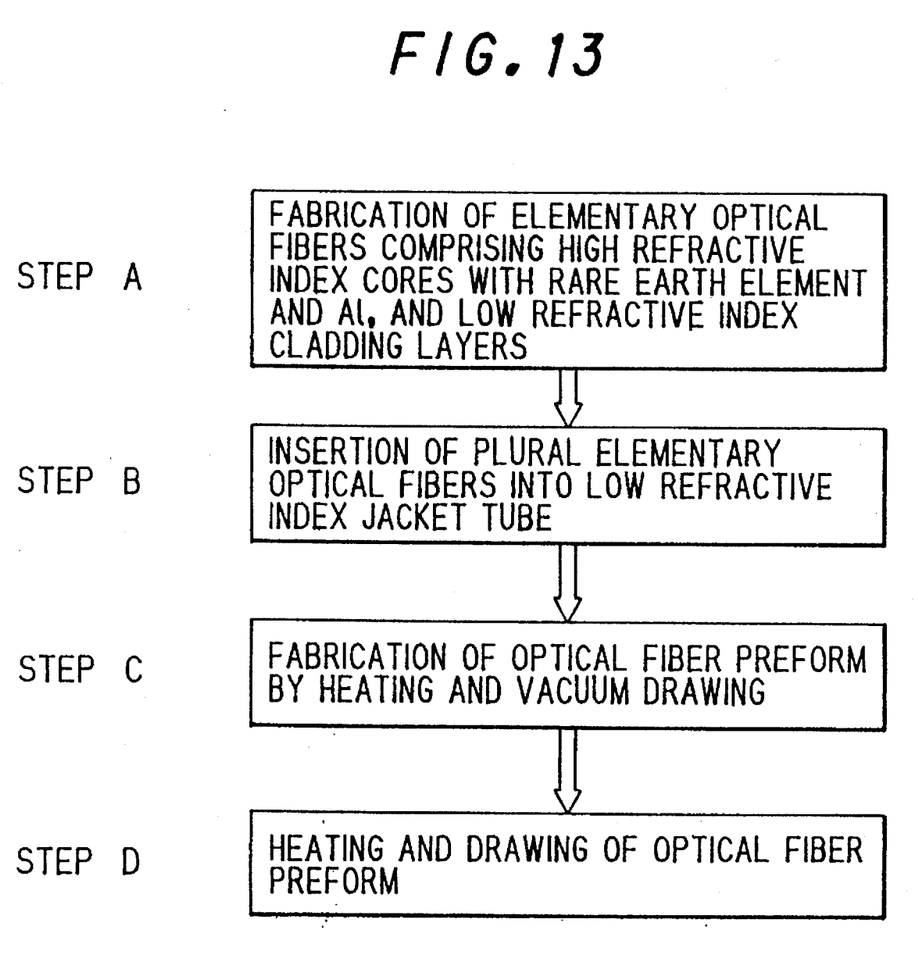
FIG. 13 is a flow chart showing a method for fabricating an rare earth element-doped multiple-core optical fiber in a preferred embodiment according to the invention.

Finally, a method for fabricating a rare earth element-doped multiple-core optical fiber in a first preferred embodiment according to the invention will be explained in FIG. 13.

At the step A, cores of a high refractive index doped with a rare earth element and aluminum are fabricated, and the cores are coated with cladding layers of a low refractive index to provide elementary optical fibers by an ordinary fabrication process such as flame deposition, outer CVD, etc.

At the step B, a predetermined number of the elementary optical fibers are placed in a jacket tube of a low refractive index such as a quartz tube, a quartz tube coated at an inner surface with a film of a low refractive index, a vycor glass tube (Corning Glass Works).

At the steps C, the jacket tube with the elementary optical fibers is heated from the outer surface thereof, while one end of the jacket tube is sealed to carry out the vacuum drawing at the other end thereof, so that outer surfaces of the elementary optical fibers, and those and the inner surface of the jacket tube are welded to each other to provide an optical fiber preform having no bubble.

At the step D, the optical fiber preform is drawn at a heating temperature to provide a rare earth element-doped multiple-core optical fiber.

At the step C, members of a low refractive index such as $SiO_2$ rods, $SiO_2$ fine particles, $SiO_2$ rods or particles doped with $B_2O_3$ and/or F may be inserted into interstices among the elementary optical fibers and the jacket tube.

In the invention as described above, cores of a high refractive index doped with the maximum doping amounts of a rare earth element and aluminum which are equal to values obtained in a conventional single-core optical fiber are prepared for an optical fiber preform. Consequently, a content of the rare earth element is increased as three times in a rare earth element-doped multiple-core optical fiber in the invention as that in the conventional single-core optical fiber to provide a high gain, and a content of aluminum is increased as three times therein as the conventional single-core optical fiber to provide wide wavelength band characteristics.

In the invention, the value "1+2t/Dw" is ranged to be 1.1 to 2.5, where t is a thickness of a cladding layer of an elementary optical fiber, and Dw is an outer diameter of a core for the elementary optical fiber. For this structure, $LP_{01}$ modes of excitation lights and signal lights supplied to rare earth element-doped multiple-cores are propagated through the multiple-cores with the approximately same coupling efficiency equal to or more than 80%. In other words, a supplied excitation light and a supplied signal light are equally distributed to each core. As a result of dividing the excitation light into n excitation lights to be distributed to the multiple-cores (n is the number of the multiple-cores), a power of each divided excitation light becomes 1/n as compared to a power of an excitation light supplied to a single-core optical fiber, where an output power of an excitation light source is controlled to be constant. As a result, a gain is lowered per one core in the invention, while the gain is uniform at a wide wavelength band in the invention.

When the above described value is less than 1.1, the multiple-cores are proximate to be a single core to make it difficult that a wavelength band becomes wide, and, when the above described value is more than 2.5, the excitation and signal lights are partially propagated through cladding layers and a jacket layer to lower a gain.

In the invention, Er, Yb, Pr, Nd, Ce, Sm, and Ho may be used for a rare earth element to be doped into multiple-cores, among which Er, or the combination of Er and Yb is preferable to be used at a wavelength band of 1.53 to 1.57 μm, and Pr or Nd is preferable to be used at a wavelength band of 1.3 μm.

In the invention, specific, refractive index differences $\Delta n1$ and $\Delta n2$ are preferable to be set more than 1% to increase confining factors of excitation and signal lights into multiple-cores, thereby providing a high gain and wide wavelength band characteristics. In practically, however, the specific refractive index differences $\Delta n1$ and $\Delta n2$ are difficult to be more than 3% due to the fabrication process.

In the invention, a ratio $D_0/Dg$ is ranged to be 12.5 to 30 to provide low loss mode field-matching connection relative to a single mode optical fiber having ordinary low specific refractive index differences $\Delta n1$ and $\Delta n2$. When the ratio $D_0/Dg$ is out of the range of 12.5 to 30, the low loss mode field-matching connection is not obtained to lower a gain.

In the invention, $SiO_2$-$GeO_2$-$Al_2O_3$ glass doped with Er and Yb is preferably used for multiple-cores, wherein the doping amount of Er is at least 200 weight ppm to provide a high gain and wide wavelength band characteristics. When the cores are of $SiO_2$ glass doped with Er, Yb and Al, at least one of Ge, P, and B may be added thereto provide specific refractive index differences $\Delta n1$ and $\Delta n2$ of 1 to 3%. In this case, a material such as B, F, etc. for lowering a refractive index may be added to cladding layers and a jacket layer of $SiO_2$ glass to further increases the specific refractive index differences $\Delta n1$ and $\Delta n2$.

As well explained above, the invention provides advantages set out below.

(1) a high gain and wide wavelength band characteristics are simultaneously obtained.

(2) the high gain and the wide wavelength band characteristics are further enhanced by using the combination of Er and Yb.

(3) long distance and wavelength-multiplexed transmission is realized.

(4) a system is structured more economically.

(5) a noise index can be suppressed at the minimum level to provide high quality of information transmission.

(6) reproducibility of a rare earth element-doped multiple-core optical fiber having predetermined structural parameters is obtained.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A rare earth element-doped multiple-core optical fiber, comprising:

at least three elementary optical fibers each comprising a core of a refractive index nw having an outer diameter of Dw, and a cladding layer of a refractive index nc(nw>nc) having a thickness of t for covering said core; and a jacket layer of a refractive index nj (nw>nj) for covering said at least three elementary optical fibers;

wherein said core is doped with at least one rare earth element and Al of at least 1 weight %; and a value of (1+2t/Dw) defined by said outer diameter of Dw and said thickness of t is ranged to be 1.1 to 2.5.

2. The optical fiber as defined in claim 1, wherein:

said rare earth element is at least one selected from Er, Yb, Nd, Ce, Sm and Ho.

3. The optical fiber as defined in claim 1, wherein:

a specific refractive index difference $\Delta n1$ $\{\Delta n1=[(nw-nc)/nw]\times 100\%\}$ between said core and said cladding layer, and a specific refractive index difference $\Delta n2$ $\{\Delta n2=[(nw-nj)/nw]\times 100\%\}$ between said core and said jacket layer are ranged to be 1 to 3%, respectively.

4. The optical fiber as defined in claim 1, wherein:

a ratio of Do/Dg is ranged to be 12.5 to 25, where Dg is an outer diameter of an assembly of said at least three elementary optical fibers, and Do is an outer diameter of said jacket layer.

5. The optical fiber as defined in claim 1, wherein:

said core is doped with Er and Yb, a doping amount of Er being at least 200 weight %.

6. The optical fiber as defined in claim 5, wherein:

said core is of $SiO_2$ glass doped with at least one of refractive index-controlling materials of Ge, P and B in addition to Er, Yb and Al.

7. A method for fabricating a rare earth element-doped multiple-core optical fiber, comprising the steps of:

providing at least three elementary optical fibers each comprising a core of a refractive index nw having an outer diameter of Dw, and a cladding layer of a refractive index nc (nw>nc) having a thickness of t for covering said core, said core being doped with at least one rare earth element and Al of at least 1 weight %, and a value of (1+2t/Dw) defined by said outer diameter of Dw and said thickness of t being ranged to be 1.1 to 2.5;

placing said at least three elementary optical fibers in a jacket tube;

providing a composite member by collapsing interstices among said at least three elementary optical fibers and said jacket tube to be welded at contact surfaces thereof at a predetermined heating temperature; and heating and drawing said composite member at a predetermined temperature.

8. The method as defined in claim 7, wherein:

the step of drawing said composite member is carried out at said predetermined heating temperature successively after the step of providing said composite member.

9. The method as defined in claim 7, wherein:

the step of providing said composite member comprises the step of filling a material of a refractive index lower than said refractive index nw into said interstices among said at least three elementary optical fibers and said jacket tube.

10. An optical amplifier, comprising:

a rare earth element-doped multiple-core optical fiber of a predetermined length, said rare earth element-doped multiple-core optical fiber comprising at least three elementary optical fibers each comprising a core of a refractive index nw having an outer diameter of Dw, and a cladding layer of a refractive index nc(nw>nc) having a thickness of t for covering said core, and a jacket layer of a refractive index nj (nw>nj) for covering said at least three elementary optical fibers, said core being doped with at least one rare earth element and Al of at least 1 weight %, and a value of (1+2t/Dw) defined by said outer diameter of Dw and said thickness of t being ranged to 1.1 to 2.5;

means for input of a signal light to an input end of said rare earth element-doped multiple-core optical fiber;

means for propagating an excitation light through said rare earth element-doped multiple-core optical fiber to amplify said signal light therein; and means for output of said signal light thus amplified from an output end of said rare earth element-doped multiple-core optical fiber.

11. The optical amplifier as defined in claim 10, wherein:

said excitation light propagating means, comprises:

a light source for emitting said excitation light;

an optical multiplexer for coupling said excitation light to said input end of said rare earth element-doped multiple-core optical fiber; and an optical demultiplexer for removing a remaining portion of said excitation light at said output end of said rare earth element-doped multiple-core optical fiber;

said input means, comprises:

a first optical isolator positioned between a signal light input terminal of said optical amplifier and said input end of said rare earth element-doped multiple-core optical fiber for propagating said signal light only in a direction of said signal light input terminal to said input end thereof;

said output means, comprises:

a second optical isolator positioned between a signal light output terminal of said optical amplifier and said output end of said rare earth element-doped multiple-core optical fiber for propagating said signal light only in a direction of said output end thereof to said output terminal.

12. The optical amplifier as defined in claim 11, further comprising:

first and second mode field-matching regions provided between said first optical isolator and said input end of said rare earth element-doped multiple-core optical fiber, and between said output end of said rare earth element-doped multiple-core optical fiber and said second optical isolator.

13. The optical amplifier as defined in claim 10, wherein:

said excitation light propagating means, comprises:

a light source for emitting said excitation light;

an optical multiplexer for coupling said excitation light to said output end of said rare earth element-doped multiple-core optical fiber; and an optical demultiplexer for removing a remaining portion of said excitation light at said input end of said rare earth element-doped multiple-core optical fiber;

said input means, comprises:

a first optical isolator positioned between a signal light input terminal of said optical amplifier and said input end of said rare earth element-doped multiple-core optical fiber for propagating said signal light only in a direction of said signal light input terminal to said input end thereof;

said output means, comprises:

a second optical isolator positioned between a signal light output terminal of said optical amplifier and said output end of said rare earth element-doped multiple-core optical fiber for propagating said signal light only in a direction of said output end thereof to said output terminal.

14. The optical amplifier as defined in claim 13, further comprising:

first and second mode field-matching regions provided between said first optical isolator and said input end of said rare earth element-doped multiple-core optical fiber, and between said output end of said rare earth element-doped multiple-core optical fiber and said second optical isolator.

15. The optical amplifier as defined in claim 10, wherein:

said excitation light propagating means, comprises:

first and second light sources for emission said excitation lights;

an optical multiplexer for coupling said excitation lights to said input and output ends of said rare earth element-doped multiple-core optical fiber; and said input means, comprises:

a first optical isolator positioned between a signal light input terminal of said optical amplifier and said input end of said rare earth element-doped multiple-core optical fiber for propagating said signal light only in a direction of said signal light input terminal to said input end thereof;

said output means, comprises:

a second optical isolator positioned between a signal light output terminal of said optical amplifier and said output end of said rare earth element-doped multiple-core optical fiber for propagating said signal light only in a direction of said output end thereof to said output terminal.

16. The optical amplifier as defined in claim 15, further comprising:

first and second mode field-matching regions provided between said first optical isolator and said input end of said rare earth element-doped multiple-core optical fiber, and between said output end of said rare earth element-doped multiple-core optical fiber and said second optical isolator.

* * * * *